United States Patent [19]

Bott

[11] 4,015,760
[45] Apr. 5, 1977

[54] VEHICLE ARTICLE CARRIER

[76] Inventor: John A. Bott, 931 Lake Shore Drive, Grosse Pointe Shores, Mich. 48236

[22] Filed: Aug. 14, 1975

[21] Appl. No.: 604,644

[52] U.S. Cl. .......................... 224/42.1 D; 105/478
[51] Int. Cl.² .......................................... B60R 9/00
[58] Field of Search ................ 224/42.1 F, 42.1 E, 224/42.1 D, 42.1 R; 248/361, 205 R, 247, 500; 211/17, 22; 105/478, 482, 485; 280/179 R, 179 A

[56] References Cited

UNITED STATES PATENTS

| 2,804,248 | 8/1957 | Samuels et al. | 224/42.1 F |
|---|---|---|---|
| 3,519,179 | 7/1970 | Stephen | 224/42.1 E |
| 3,610,491 | 10/1971 | Bott | 224/42.1 F |
| 3,899,110 | 8/1975 | Binding | 224/42.1 F |
| 3,931,919 | 1/1976 | Gerber | 224/42.1 F |
| R26,538 | 3/1969 | Bott | 224/42.1 E |

*Primary Examiner*—Frank E. Werner
*Assistant Examiner*—Kenneth Noland
*Attorney, Agent, or Firm*—Harness, Dickey & Pierce

[57] ABSTRACT

A carrier for luggage or the like is mounted on a vehicle body. The carrier consists of separate load supporting slats each of which has an upwardly facing groove running lengthwise thereof. The slats are made from roll formed sheet steel and their grooves provide means for securing adjustable tie-down members or other article securing devices on the slats. Decorative and protective plastic strips are also fitted in the slat grooves.

7 Claims, 7 Drawing Figures

U.S. Patent  April 5, 1977  4,015,760
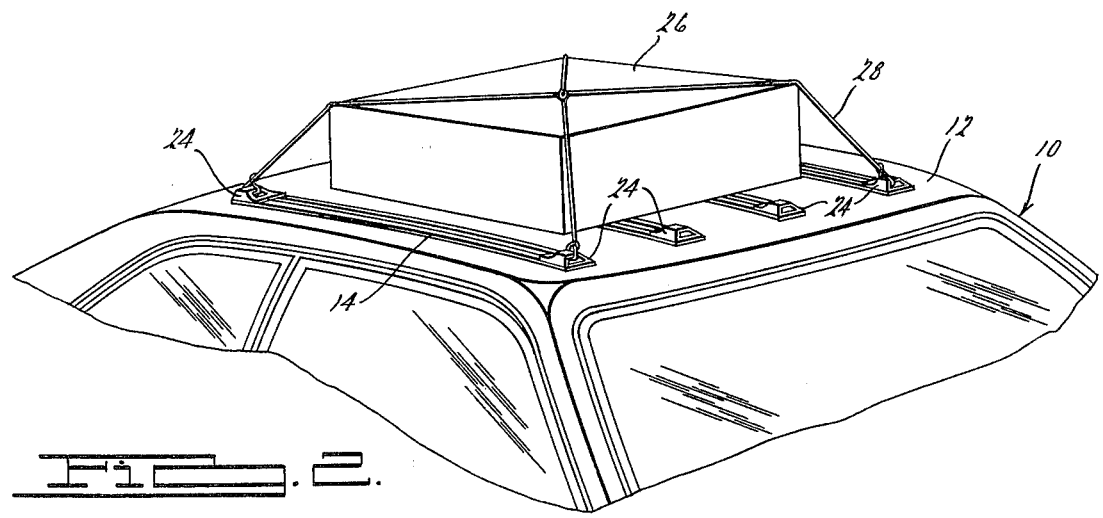
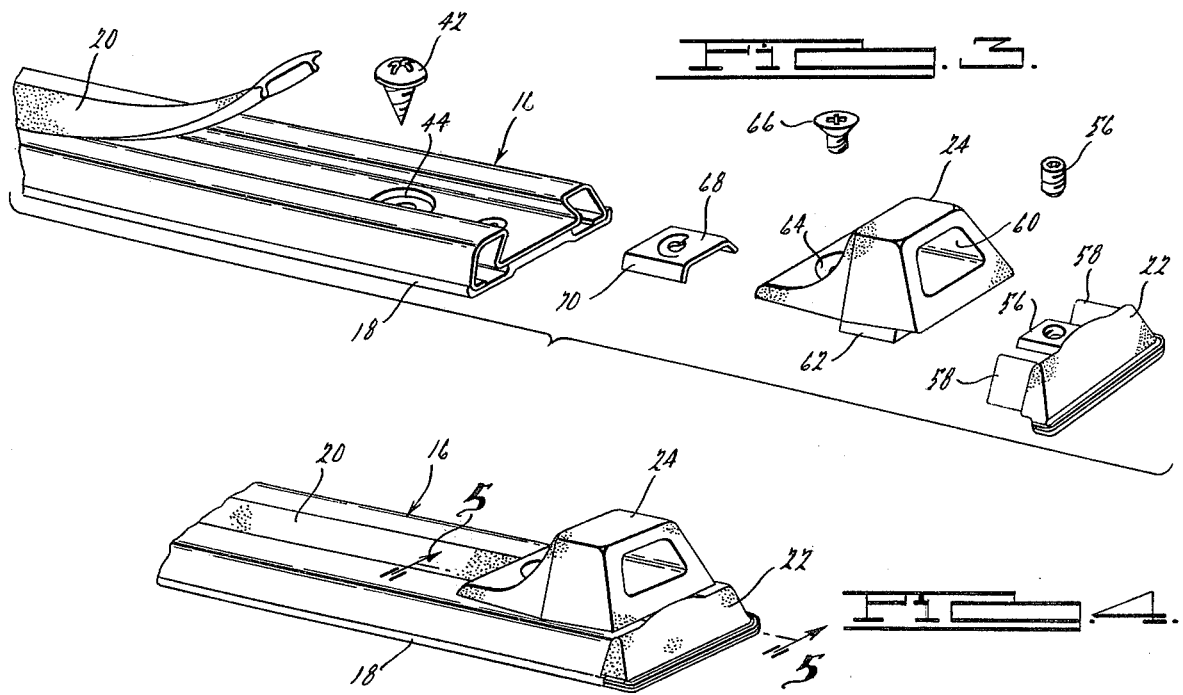
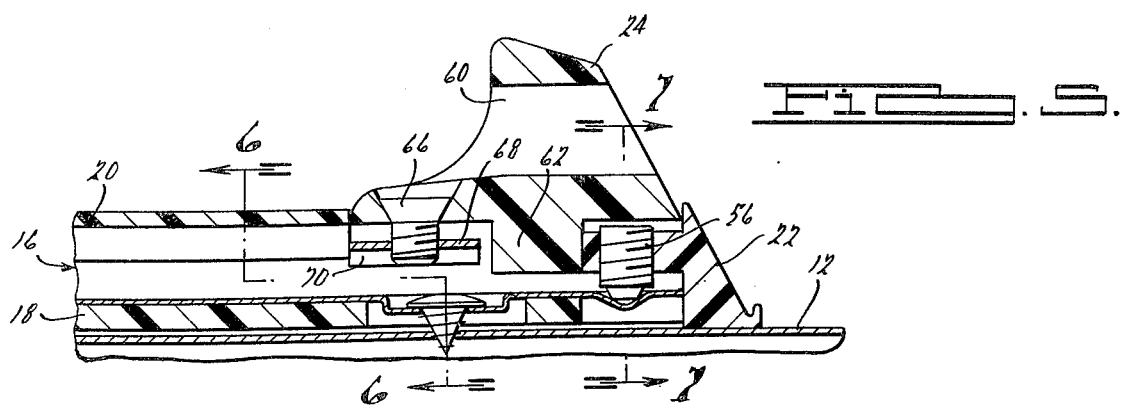

VEHICLE ARTICLE CARRIER

BACKGROUND OF THE INVENTION

The luggage carrier illustrated herein represents an improvement over the construction shown in my prior copending United States Patent Application Ser. No. 486,415, filed July 8, 1974. The carrier is attractive in appearance, relatively inexpensive to manufacture, strong and durable in construction, versatile in use and minimizes undesirable wind resistance. The carrier illustrated herein differs from the carrier of my above mentioned prior application principally in the construction of the metal slat.

SUMMARY OF THE INVENTION

The luggage rack of the present invention utilizes slats made from roll formed strips of sheet metal. Each slat has a pair of upwardly converging inner walls defining a groove therebetween which runs the length of the slat. The groove receives and holds a fastener or the like for securing an adjustable tie-down member or other article securing device on the slat. The slat also has outer walls spaced on the opposite sides of the inner walls with supporting ledges connecting the upper ends of the inner and outer walls on opposite sides of the groove. An article to be transported can rest directly on the supporting ledges or on a decorative and protective plastic strip which is desirably mounted on the ledges and is held in place by resilient ribs formed on its underside and fitted in the slat groove. The inner and outer walls cooperate to carry the weight of an article resting on the slat.

DESCRIPTION OF THE FIGURES OF THE DRAWING

FIG. 2 is a view similar to FIG. 1 showing an article to be transported secured on the article carrier;

FIG 3. is an exploded perspective view of a portion of one of the slats which make up the luggage carrier of FIGS. 1 and 2;

FIG. 4 is an assembled perspective view of the structure illustrated in FIG. 3;

FIG. 5 is an enlarged sectional view of the structure illustrated in FIG. 4 taken along the line 5—5 thereof.

DETAILED DESCRIPTION OF THE ILLUSTRATED EMBODIMENT OF THE INVENTION

Figure 1:
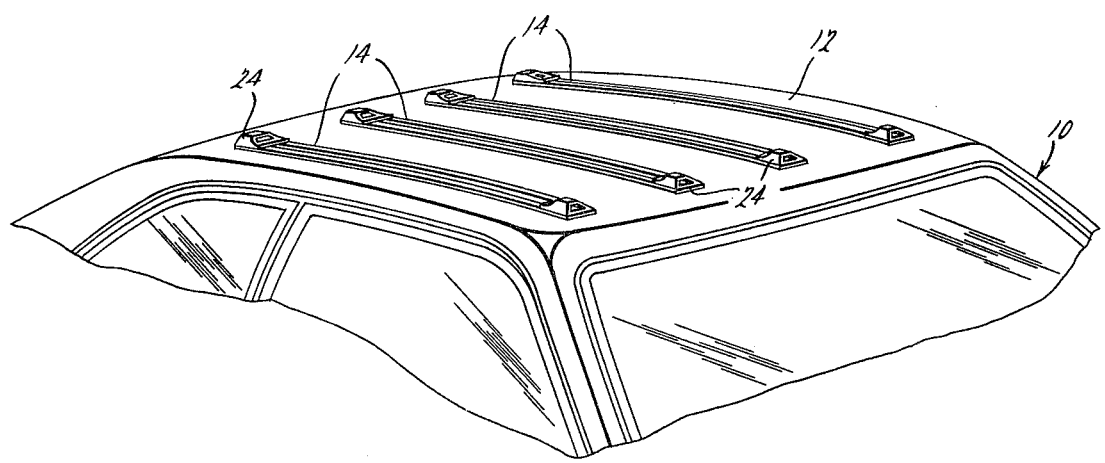
FIG. 1 is a perspective view of an article carrier of the present invention shown mounted on the roof of a fragmentarily illustrated passenger car.

FIG. 1 shows an automobile 10 having a roof 12 which is disposed in a generally horizontal plane. Mounted on the roof 12 are a plurality of slat assemblies 14 which are arranged in spaced parallel relation, extending longitudinally of the automobile 10. The slat assemblies 14, while they are separate from one another and connected only through the automobile roof, cooperate to comprise the luggage carrier of the present invention.

Each slat assembly 14 includes a slat 16 made from a roll formed strip of stainless steel sheet material. The slat 16 rests on an extruded relatively soft plastic mounting pad 18. A decorative and protective extruded plastic strip 20 of somewhat more rigid mateial than the pad 18 is positioned on the upper surface of each slat 16. The other principal parts of each slat assembly 14 comprises a pair of end caps 22, located one at each end of the slat 16 and a pair of eye tie-down members 24.

While a variety of different articles may be transported on the luggage carrier of the present invention, a typical use of the carrier is illustrated in FIG. 2 in which a box 26 is shown resting on the slat assemblies 14 and is secured in place by rope 28 tied to various of the tie-down members 24.

Figure 6:
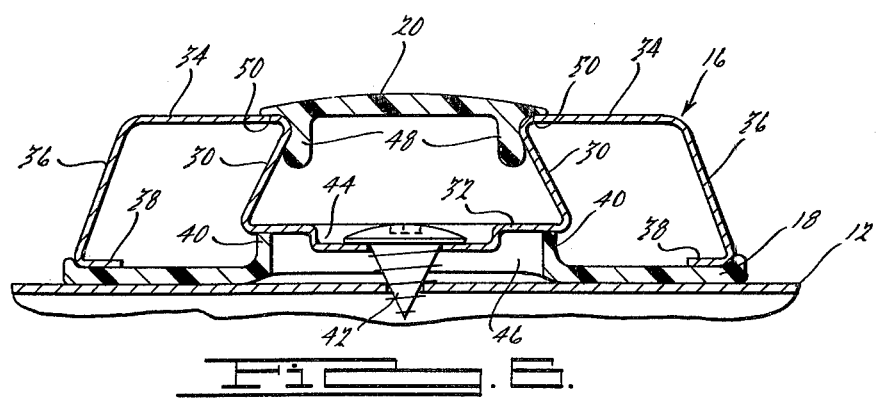
FIGS. 6 and 7 are sectional views of the structure shown in FIG. 5 taken along the lines 6—6 and 7—7 thereof, respectively.
Figure 7:
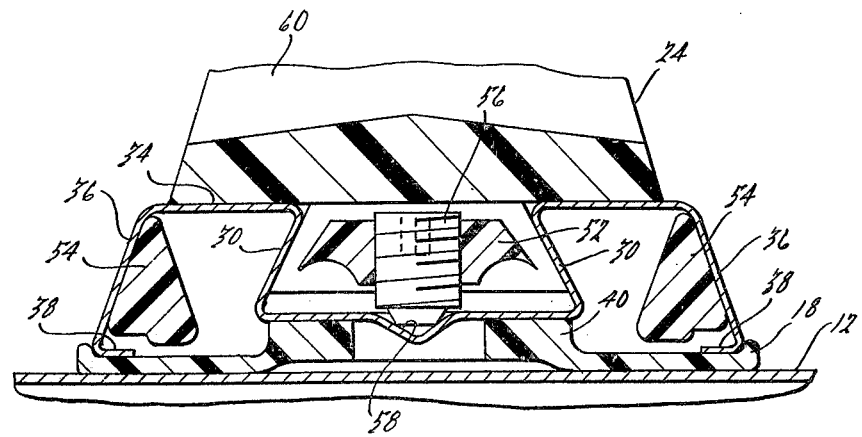

The cross sectional shape of each slat 16 is best shown in FIG. 6. The slat 16 will be seen to have a pair of upwardly converging inner walls 30 which are joined at their lower ends by means of a connecting web portion 32. The walls 30 and web portion 32 together define an upwardly open groove extending longitudinally along the middle of the slat 16. Extending horizontally outwardly from the upper ends of the inner walls 30 are a pair of supporting walls or surfaces 34 which are connected on their outer sides to a pair of upstanding outer walls 36 of the slat. The lower ends of the outer walls 36 have their margins inturned to form supporting ledges 38. It will be seen that the web portion 32 of the slat 16 is disposed in a plane located above the level of the ledges 38. However, the mounting pad 18 has a raised center portion 40 which engages the bottom of the web portion 32. Accordingly, both the ledges 38 and the web portion 32 are fully supported by the mounting pad 18 for the transference of a load through both the walls 30 and 36 to the roof 12.

The slats 16 and their mounting pads 18 are held in place on the car roof 12 by means of screws 42. As will be seen in FIG. 6, the head of each screw 42 is recessed within a pocket 44 provided for that purpose in the web portion 32. The mounting pad 18 is provided with a suitable opening 46 for the reception of the pocket 44 and screw 42. The plastic protective and decorative strips 20 are mounted on the slats 16 by the provision of spaced depending ribs 48 formed on the undersides of the strips. The ribs 48 project into the groove defined between the walls 30 and are suitably shaped to have an interference fit with the walls 30. The shape and spacing of the ribs 48 are such that the ribs may be inserted into the slat groove simply by pressing downwardly on the strip 20 so that the ribs 48 will snap past the upper edges of the walls 30. It will be seen that the strips 20 have shoulders 50 which project outwardly of the ribs 48 and rest on the supporting surfaces or walls 34. By this means the weight of an object resting on the strip 20 is transferred to the supporting walls 34 and through the walls 30, 36 to the mounting pad 18 and automobile roof 12.

The slat assemblies 14 are finished at their ends by means of the molded plastic end caps 22 of identical construction. Each end cap 22 has a central tongue 52 projecting into the groove between the walls 30 and a pair of outer tongues 54 projecting into the spaces between the inner and outer walls 30 and 36 on each side of the groove. The outer tongues 54 engage the inner surfaces of the slat outer walls 36 and supporting walls 34 to prevent tilting and/or upward movement of the end cap 22 relative to the slat 16. A setscrew 56 is threaded through the center tongue 52 and engages a depression 58 formed in the web portion 32 to prevent the end cap 22 from being pulled out of the end of the slat 16.

The slats 16 are designed to support article securing members on the surfaces 34. Such an article securing member is illustrated in the form of the eyed tie-down member 24 which has an eyelet 60, a depending key 62 conformably fitted in the groove between the walls 30 and a screw receiving opening 64. A screw 66 is seated in the opening 64 and projects into the groove between the walls 30 for threaded engagement with a stamped sheet metal nut 68. The nut 68 has sidewalls 70 which engage the inner surfaces of the inner walls 30 to resist upward movement of the nut 68 out of the groove between the walls 30. The screw 66 is threaded into the nut 68 and is tightened to clamp the tie-down member 24 firmly in place on the supporting surfaces 34. When the screw 66 is loosened and the plastic strip 20 removed, the tie-down members 24 can be slid along the length of the slat 16 and tightened in any desired position.

It should be noted that the decorative and protective plastic strips 20 serve several functions. Firstly, they cover the screws 42 and close the groove between the walls 30 to improve the overall appearance of the slat assemblies 14. If desired, the strips 20 can be color coordinated with other parts of the car such as a vinyl roof covering. In addition the plastic strips 20 protect luggage from possibly being scratched.

What is claimed is:

1. In a luggage rack, a slat made from a roll formed strip of metal and having a pair of upwardly converging inner walls defining an upwardly open dovetail groove therebetween, a web portion connecting the lower ends of said inner walls and providing a means of connection to a vehicle body surface, outer walls spaced on opposite sides of said inner walls, a pair of horizontal supporting walls on opposite sides of said groove connecting the upper ends of an inner wall and an outer wall on one side of said groove and an inner wall and an outer wall on the other side of said groove, said inner and outer walls forming downwardly presenting channels and cooperating to support the weight of a load positioned on said supporting walls, and an article securing member on at least one end of said dovetail groove for receiving means for securing an article on said slat, said article securing member being adjustably fastened to said slat.

2. The structure as set forth in claim 1 in which said web of the dovetail groove is provided with openings for receiving fasteners for mounting said slats on a vehicle body surface.

3. The structure set forth in claim 1 in which the outer walls of said downwardly presenting channels are provided with inturned aligned ledges at the lower ends which are disposed below the web of said dovetail groove.

4. The struc ture set forth in claim 1 including a resilient decorative and protective strip positioned at the top of the dovetail groove having downwardly extending ribs at the side edges forming corners which are snap fitted in the top of said groove for holding said strip on said slat.

5. The structure set forth in claim 4 in which said strip comprises a plastic extrusion.

6. The structure set forth in claim 1 including a nut positioned in said dovetail groove, an article securing member slideable in each end of said dovetail groove, and an end cap having a threaded stud which is secured to the web of the dovetail groove after which the securing member is slid over said stud and locked in position by said nut.

7. The structure set forth in claim 1 including a mounting pad positioned under said aligned ledges of said slat and projected upwardly at the center to engage the web of the dovetail groove for transferring the weight of an article resting on said supporting slat evenly over the vehicle body surface.

* * * * *